United States Patent
Takano et al.

(10) Patent No.: US 7,570,197 B2
(45) Date of Patent: Aug. 4, 2009

(54) RADAR DEVICE

(75) Inventors: Kazuaki Takano, Mito (JP); Jiro Takezaki, Hitachinaka (JP); Hiroshi Kuroda, Hitachinaka (JP); Hiroshi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/478,805

(22) PCT Filed: May 30, 2001

(86) PCT No.: PCT/JP01/04540

§ 371 (c)(1),
(2), (4) Date: Nov. 26, 2003

(87) PCT Pub. No.: WO02/099456

PCT Pub. Date: Dec. 12, 2002

(65) Prior Publication Data

US 2004/0145512 A1   Jul. 29, 2004

(51) Int. Cl.
*G01S 13/93* (2006.01)
*G01S 7/40* (2006.01)
*G01S 13/00* (2006.01)
*G01S 7/00* (2006.01)

(52) U.S. Cl. ............... 342/70; 342/27; 342/118; 342/128; 342/165; 342/173; 342/175; 342/195; 342/196; 343/711

(58) Field of Classification Search .......... 342/27, 342/28, 70–72, 128–133, 175, 192, 193–197, 342/165, 173, 174; 701/300, 301; 180/167–169; 343/711–717
See application file for complete search history.

(56) References Cited

U.S. PATENT DOCUMENTS 2,690,555 A * 9/1954 Baynard ............... 342/71
3,735,398 A * 5/1973 Ross ..................... 342/72

(Continued)

FOREIGN PATENT DOCUMENTS

EP          0 443 643 A2    8/1991

(Continued)

OTHER PUBLICATIONS

"Current Status and Traends of mm-Wave Automotive Radar", Journal of Institute of Electronics, Information and Communication Engineers, Oct. 1996, pp. 997-981.

(Continued)

*Primary Examiner*—Bernarr E Gregory
(74) *Attorney, Agent, or Firm*—Crowell & Moring LLP

(57) ABSTRACT

One of the objects of the present invention is to reduce the size of a radar device mounted on a vehicle body. To achieve the object, one aspect of the invention provides a radar device, which is mounted on a vehicle body and detects a target present in a moving direction of the vehicle body, with (1) a transmitting antenna for transmitting a mm-Wave that forms an electric field having a width equivalent to the width of the vehicle body at a position away in a moving direction of the vehicle body by a distance corresponding to the most-approached distance defined between the vehicle body and the target and (2) two receiving antennas for receiving the reflected mm-Waves at mutually different positions.

10 Claims, 17 Drawing Sheets

U.S. PATENT DOCUMENTS

| | | | | |
|---|---|---|---|---|
| 3,749,197 | A * | 7/1973 | Deutsch | 342/71 |
| 3,750,169 | A * | 7/1973 | Strenglein | 342/72 |
| 3,772,690 | A * | 11/1973 | Nations | 372/72 |
| 3,778,823 | A * | 12/1973 | Sato et al. | 342/72 |
| 3,858,205 | A * | 12/1974 | Ross | 342/72 |
| 4,150,375 | A * | 4/1979 | Ross et al. | 342/71 |
| 5,402,129 | A | 3/1995 | Gellner et al. | |
| 5,712,640 | A * | 1/1998 | Andou et al. | 342/70 |
| 6,020,844 | A | 2/2000 | Bai et al. | |
| 6,040,795 | A | 3/2000 | Watanabe | |
| 6,087,975 | A | 7/2000 | Sugimoto et al. | |
| 6,275,180 | B1 * | 8/2001 | Dean et al. | 342/70 |
| 6,573,859 | B2 * | 6/2003 | Tokoro | 342/70 |
| 6,583,753 | B1 * | 6/2003 | Reed | 342/70 |
| 6,646,589 | B2 * | 11/2003 | Natsume | 342/70 |
| 6,693,581 | B2 * | 2/2004 | Gottwald et al. | 342/70 |

FOREIGN PATENT DOCUMENTS

| | | |
|---|---|---|
| EP | 0 773 452 A1 | 5/1997 |
| EP | 0 825 454 A2 | 2/1998 |
| EP | 930191 A2 | 7/1999 |
| JP | 5-223932 A | 9/1993 |
| JP | 6-214015 A | 8/1994 |
| JP | 8-86874 A | 4/1996 |
| JP | 9-33643 A | 2/1997 |
| JP | 11-94943 A | 4/1999 |
| JP | 11-118925 A | 4/1999 |
| JP | 11-144198 A | 5/1999 |
| JP | 11-194165 A | 7/1999 |
| JP | 11-198678 A | 7/1999 |
| JP | 11-326495 A | 11/1999 |
| JP | 2000-230974 A | 8/2000 |
| JP | 2000-284047 A | 10/2000 |
| JP | 2000-292530 A | 10/2000 |
| JP | 2000-315299 A | 11/2000 |
| JP | 2001-51050 A | 2/2001 |
| JP | 2001-124846 A | 5/2001 |
| JP | 2001-124848 A | 5/2001 |

OTHER PUBLICATIONS

"mm-Wave Radar-Assisted Vehicle-to-Vehicle Distance Warning Device", Sensor Actuator/Week '99 General Symposium; Automobile and Sensor Technology.

Article in "Nikkei Electronics", Feb. 22, pp. 47-53.

L. Giubbolini, A Multistatic Microwave Radar Sensor of Short Range Anticollision Warning, IEEE Transactions on Vehicular Technology, Nov. 2000, pp. 2270-2275, vol. 49, No. 6.

European Search Report dated Oct. 12, 2006 (five (5) pages).

Japanese Office Action dated Feb. 13, 2007 with a partial English translation (Six (6) pages).

* cited by examiner

HORIZONTAL DETECTING RANGE
(ANGLE) OF RADAR $\theta$ $\theta \propto \lambda / W$

RADAR DEVICE

The present invention relates to a mm-Wave radar which transmits a mm-Wave and receives its echo to detect a relative speed of a target, a distance to the target, a deviation angle of a target direction with respect to a reference direction and other target information.

BACKGROUND OF THE INVENTION

A vehicle-mounted radar for detecting a distance to a target and a relative speed of the target is classified into various types according to modulation of a radar used Therefore. For example, "Current Status and Trends of mm-Wave Automotive Radar" in Journal of Institute of Electronics, Information and Communication Engineers, October 1996, (pp. 977-981) discloses a dual-frequency CW (Continuous Wave) system, an FMCW (Frequency Modulated Continuous Wave) system and a pulse system as such systems. The radar of the dual-frequency CW system alternately transmits two kinds of continuous waves having different frequencies, mixes the echoes of the transmitted waves, and detects a relative speed of the target and a distance to the target according to a frequency and a phase of the obtained signal. The radar of the FMCW system transmits a continuous wave having frequency modulation done by a triangular wave and also mixes the transmitted wave and the echo from the target, and detects a distance to the target and a relative speed of the target based on the frequency of a beat signal obtained. The radar of the pulse system transmits a pulse wave, counts a lapse of time until its echo is received, and detects a distance to the target based on the counted value.

It is also possible to detect a deviation angle (hereinafter called as an azimuth angle) of a target direction with respect to the reference direction by the radars of such systems. As systems □herefore, Sensor Actuator/Week '99 General Symposium: Automobile and Sensor Technology, "mm-Wave Radar-Assisted Vehicle-to-Vehicle Distance Warning Device" discloses a mechanical scanning system, a beam switching system and a monopulse system. These three systems are summarized below.

(1) Mechanical Scanning System

As shown in FIG. 1, the radar of the mechanical scanning system scans a horizontal plane with a main beam A from a transmitting/receiving antenna 11 by oscillating the transmitting/receiving antenna 11 about an axis O by a servomotor or the like. This mechanical scanning-type radar needs to expand a turning angle Ø of the transmitting/receiving antenna 11 in order to expand a scanning range θ by the main beam A from the transmitting/receiving antenna 11. To do so, it is necessary to have a larger depth in a casing 10, in which the transmitting/receiving antenna 11 is accommodated, so not to disturb the transmitting/receiving antenna 11 from oscillating. For example, to change the scanning range θ by the main beam A from the transmitting/receiving antenna 11 from an angle $θ_1$ of a level of a horizontal beam width to an angle $θ_2$ larger than that as shown in FIG. 2, it is necessary to change a depth D of the housing to at least a value $D_2$ larger than a value $D_1$ of a level of the thickness of the transmitting/receiving antenna 11. Therefore, the radar itself comes to have a large size.

(2) Beam Switching System

As shown in FIG. 3, the radar of the beam switching system scans a horizontal plane by the main beam from an antenna 30 by sequentially switching transmitter-receivers $31S_1$, $31S_2, \ldots, 31S_n$ on the antenna 30 which transmits beams $A_1$, $A_2, \ldots, A_n$ having different directions from one another. This beam switching type radar needs to increase the number of the transmitter-receivers $31S_1, 31S_2, \ldots, 31S_n$ on the antenna 30 to expand the scanning range θ by the main beam from the antenna 30. To do so, it is necessary to secure a space for arrangement of add-on receivers by increasing a horizontal width of the antenna 30. For example, as shown in FIG. 4, it is necessary to change a width W of the antenna 30 from the present value $W_3$ to a value $W_4$ larger than that in order to change the scanning range θ by the main beam from the antenna 30 from the present angle $θ_3$ to an angle $θ_4$ which is larger than that. Therefore, the radar itself comes to have a large size.

(3) Monopulse System

The radar of the monopulse system receives echoes from a target by two antennas which are disposed side to side to detect an azimuth angle of the target based on a phase difference of the waves received by the two antennas.

The above-described radars of the individual systems are started to be in practical use as a vehicle-mounted radar predicated on use on freeways as described in Nikkei Electronics, Feb. 22, 1999 (pp. 47-53).

BRIEF SUMMARY OF THE INVENTION

One of the objects of the present invention is to reduce the size of a radar device mounted on a vehicle body. To achieve the object, one aspect of the invention provides:

a radar device which is mounted on a vehicle body and detects a target present in a moving direction of the vehicle body, comprising:

a transmitting antenna for transmitting a mm-Wave that forms an electric field having a width corresponding to a width of the vehicle body at a position away in a moving direction of the vehicle body by a distance corresponding to the most-approached distance prescribed between the vehicle body and the target, and two receiving antennas for receiving the reflected mm-Waves at mutually different positions.

DETAILED DESCRIPTION OF THE INVENTION

Embodiments according to the invention will be described with reference to the accompanying drawings.

First, the configuration of a monopulse type radar according to this embodiment will be described. Here, the configuration of a homodyne type dual-frequency CW radar will be described as an example, but it does not mean that the application of the present invention to the heterodyne type dual-frequency CW radar is inhibited.

Figure 1:
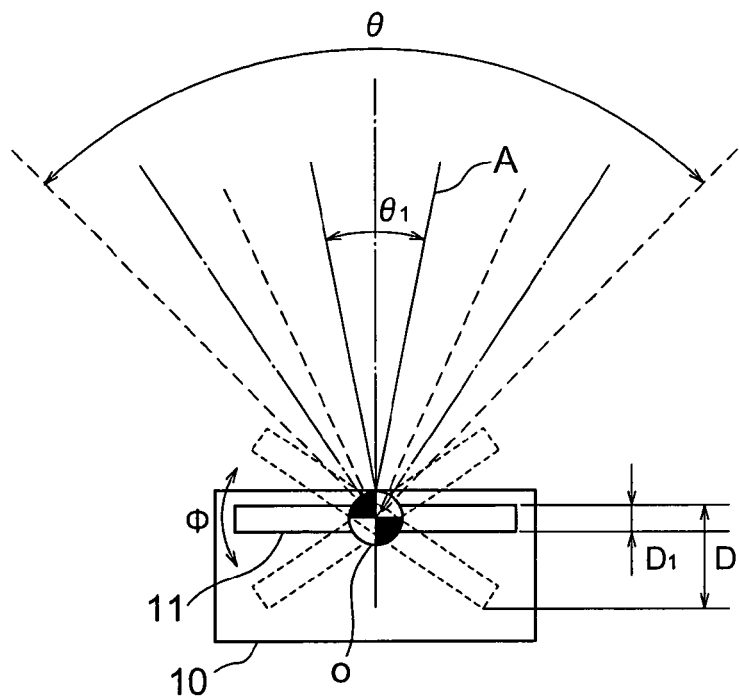
FIG. 1 is a diagram for explaining scanning in a horizontal plane by a beam of a mechanical scanning-type radar.
Figure 2:
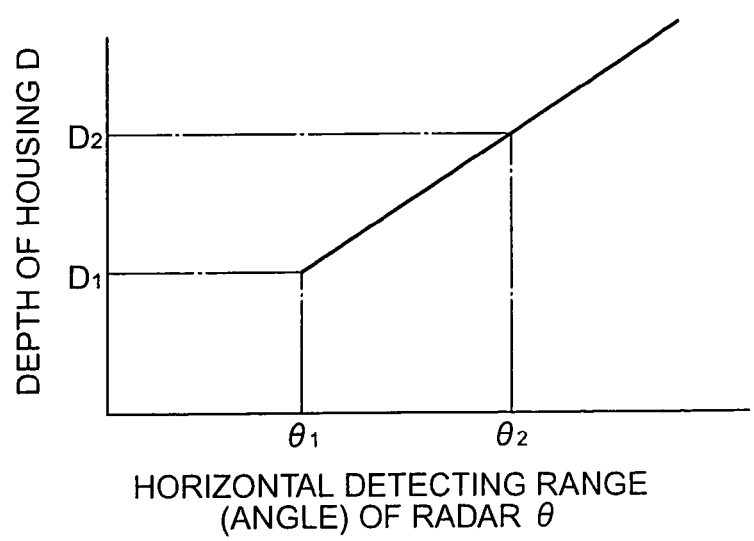
FIG. 2 is a diagram showing a relationship between a scanning range and a depth of the mechanical scanning-type radar.
Figure 3:
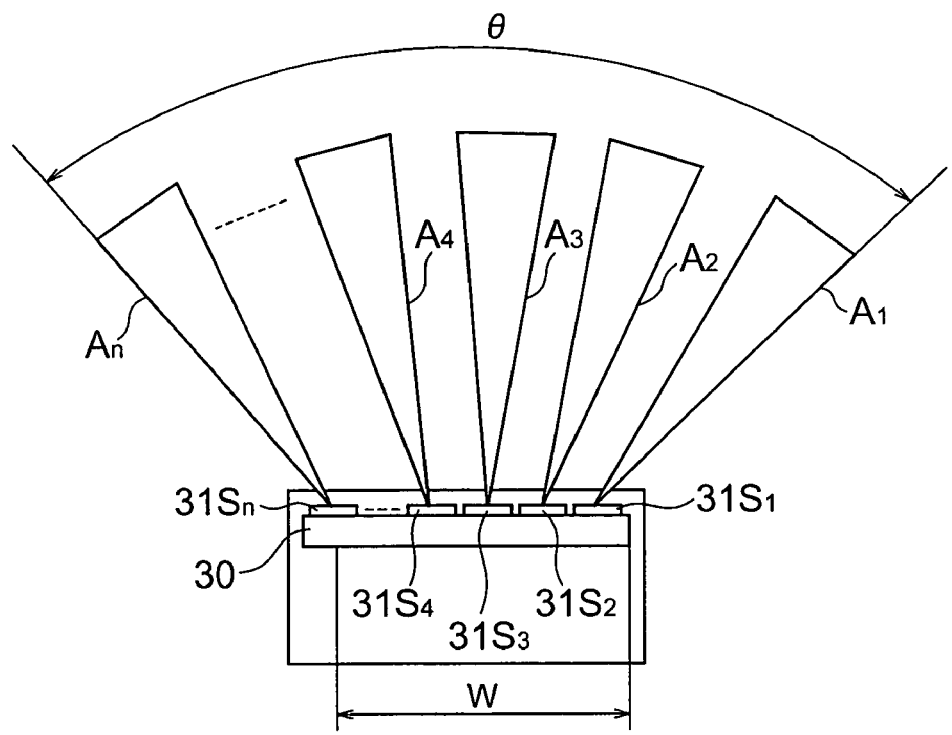
FIG. 3 is a diagram for explaining scanning in a horizontal plane by a beam of a beam switching type radar.
Figure 4:
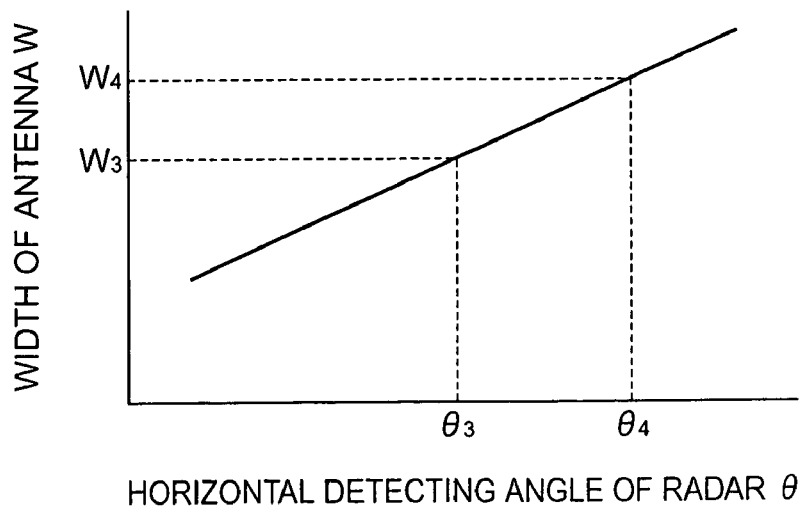
FIG. 4 is a diagram showing a relationship between a scanning range and an antenna width of the beam switching type radar.
Figure 5:
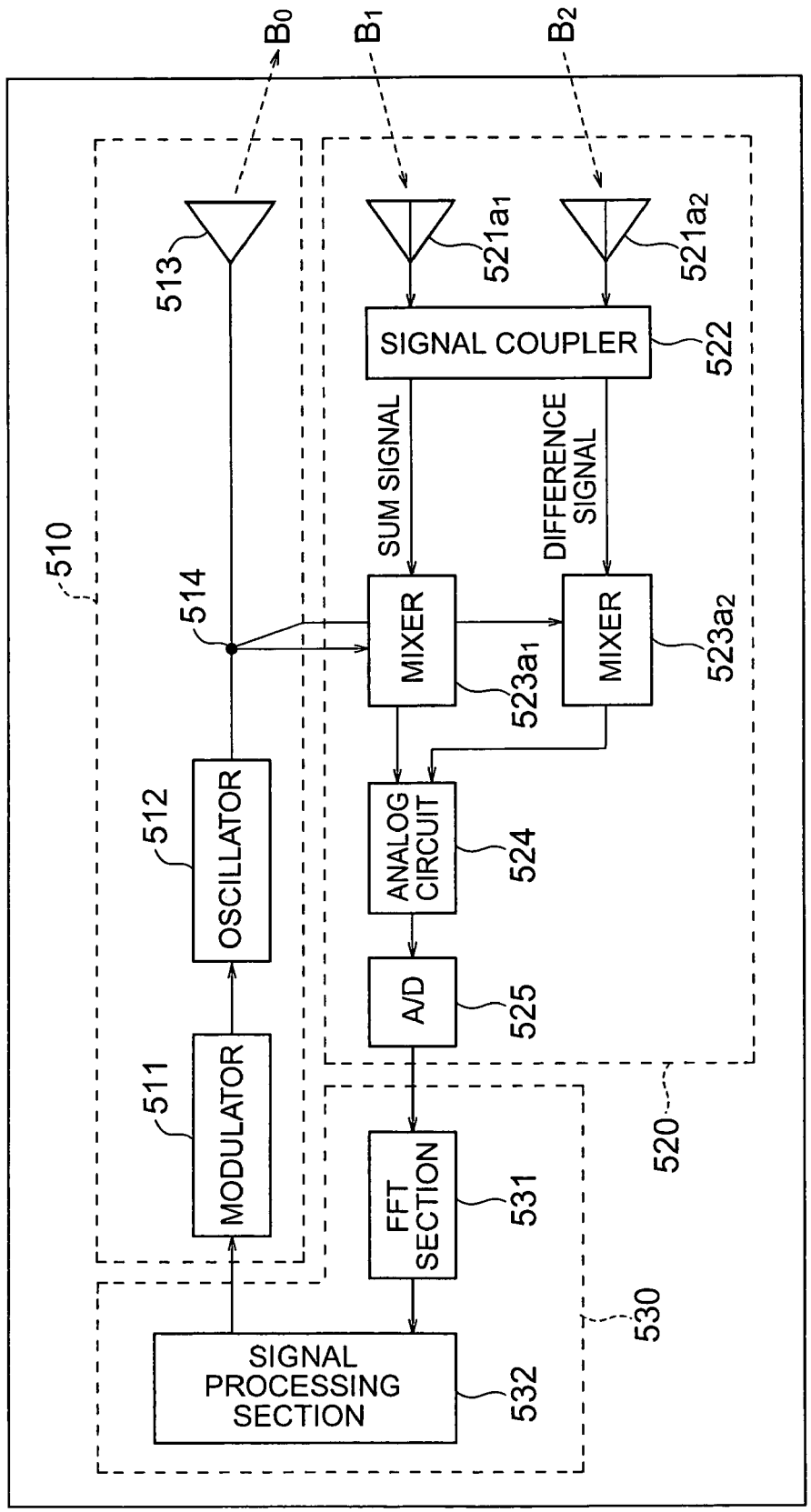
FIG. 5 is a block diagram of the dual-frequency CW radar device according to one embodiment of the invention.

As shown in FIG. 5, a monopulse type radar 50 has a transmitting section 510 which sends a mm-Wave $B_0$ to ahead of the loaded vehicle, a receiving section 520 which receives at mutually different positions echoes $B_1$, $B_2$ from the target, a control processing section 530 which detects target information (the presence of a target, a distance from the target, a relative speed of the target and an azimuth angle in a horizontal plane of the target) and a housing (not shown) for enclosing them.

Figure 6:
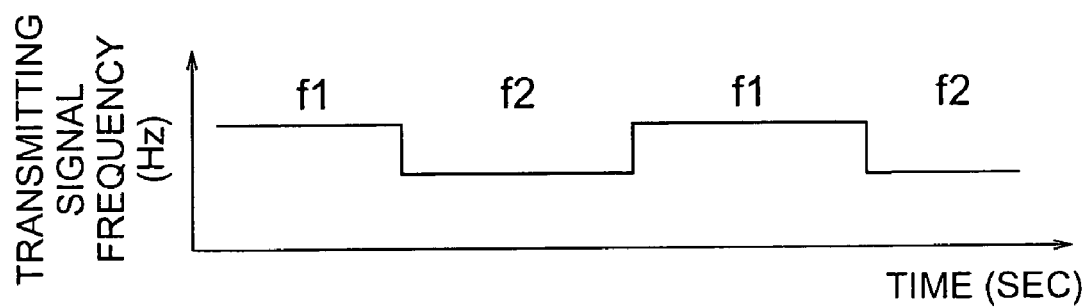
FIG. 6 is a diagram showing a frequency change of transmission mm-Waves from the dual-frequency CW radar device according to one embodiment of the invention.

The transmitting section 510 includes a modulator 511 which alternately outputs two kinds of modulated signals according to a changing command from the control processing section 530, an oscillator 512 which outputs a high-frequency signal (e.g., a millimeter wave) having a transmission frequency corresponding to the modulated signal from the modulator 511, a transmitting antenna 513 which radiates the output signal from the oscillator 512 as the mm-Wave $B_0$, a directional coupler 514 which guides part of the output, which is from the oscillator 512 as a reference signal for the conversion of a frequency into an intermediate frequency band, to the receiving section 520, and the like. By configuring as described above, the transmitting section 510 alternately emits continuous waves with mutually different transmission frequencies $f_1$, $f_2$ from the transmitting antenna 513 to ahead of the loaded vehicle as shown in FIG. 6.

Figure 7:
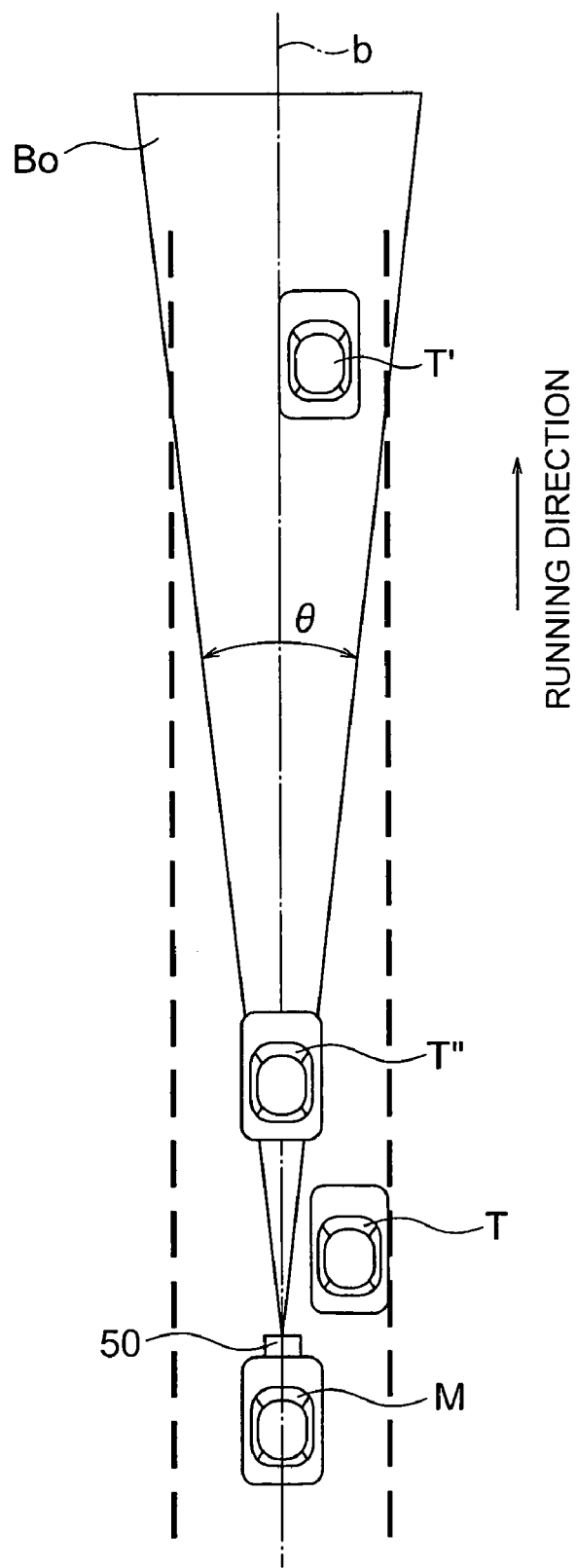
FIG. 7 is a diagram for explaining conditions to be met by a field-of-view of mm-Wave from a transmitting antenna of the radar device according to an embodiment of the invention.

Generally, when traveling at a low speed, a distance from a preceding vehicle is shorter than when traveling at a high speed, so that the vehicles tend to have a short distance between them. When the radar is aimed at a driver's watching area when traveling at a high speed, the emitted electric field becomes narrow at a short distance as shown in FIG. 7. Therefore, when the radar is aimed at the driver's watching area when traveling at a high speed, a preceding vehicle T″ which is in the vicinity of the central axis b (reference direction) of the mm-Wave $B_0$, a preceding vehicle T′ going far ahead and the like are detected, but there is a possibility that a preceding vehicle T which is close to a line and in a short distance from the radar-loaded vehicle (hereinafter called as an own vehicle) is not detected. Therefore, it is assumed in this embodiment that the target is closest to the own vehicle M and close to a line, and a field-of-view θ of the mm-Wave $B_0$ from the transmitting antenna 513 is expanded to include at least a prescribed portion of the target, which is closest to the own vehicle M and close to a line, into the electric field emitted from the transmitting antenna 513. Here, the assumed closest distance to the target is not a minimum distance that two vehicles can be approached physically but a designed minimum distance that the own vehicle can approach the preceding vehicle while securing traveling safety, specifically a distance that is assumed to be kept from the preceding vehicle when a traffic is heavy. Its specific value is variable depending on vehicle types on which the radar device is mounted but generally approximately 1 m to 3 m.

Figure 8:
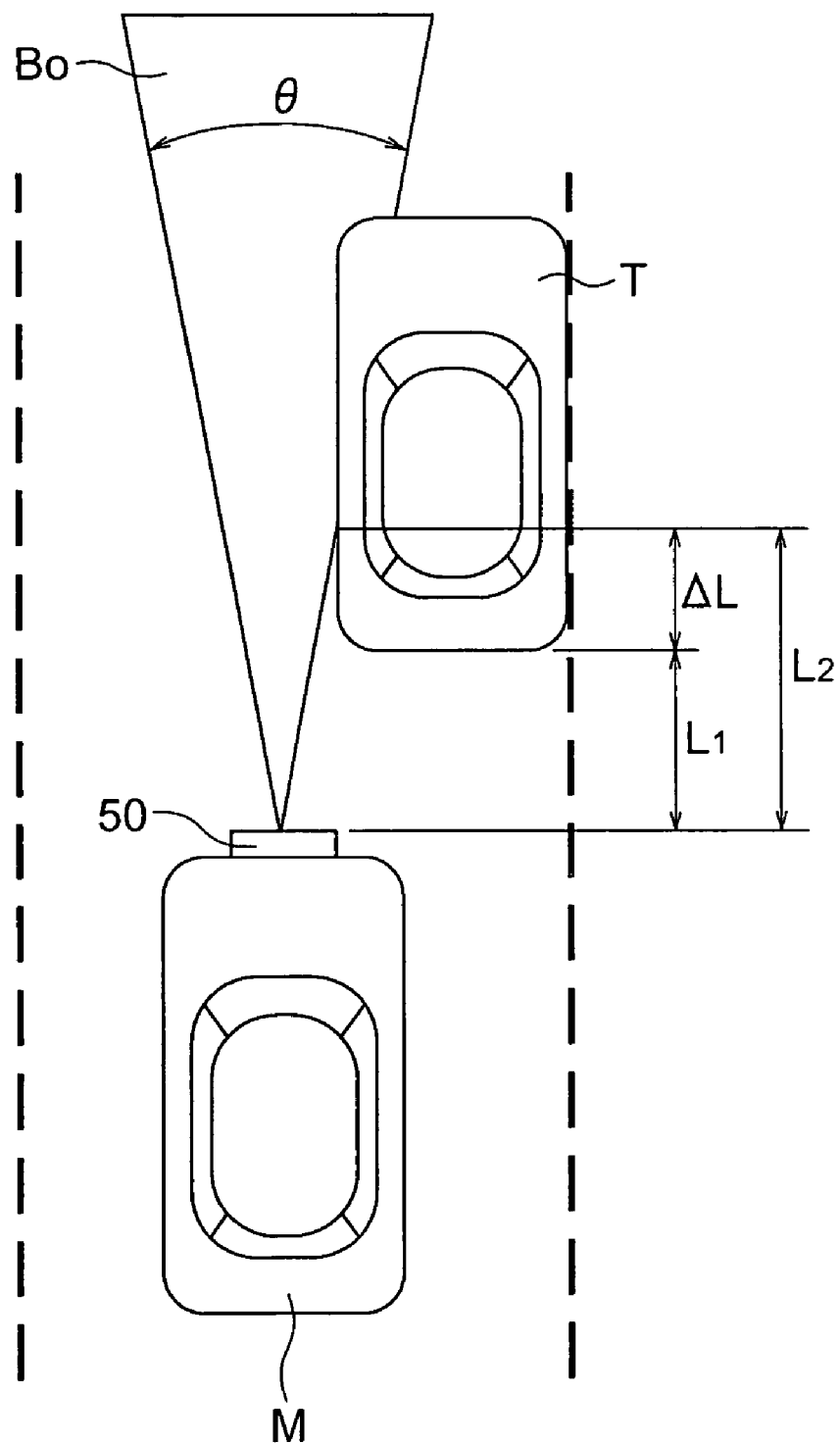
FIG. 8 is a diagram for explaining conditions to be met by a field-of-view of mm-Wave from the transmitting antenna of the radar device according to the embodiment of the invention.
Figure 9:
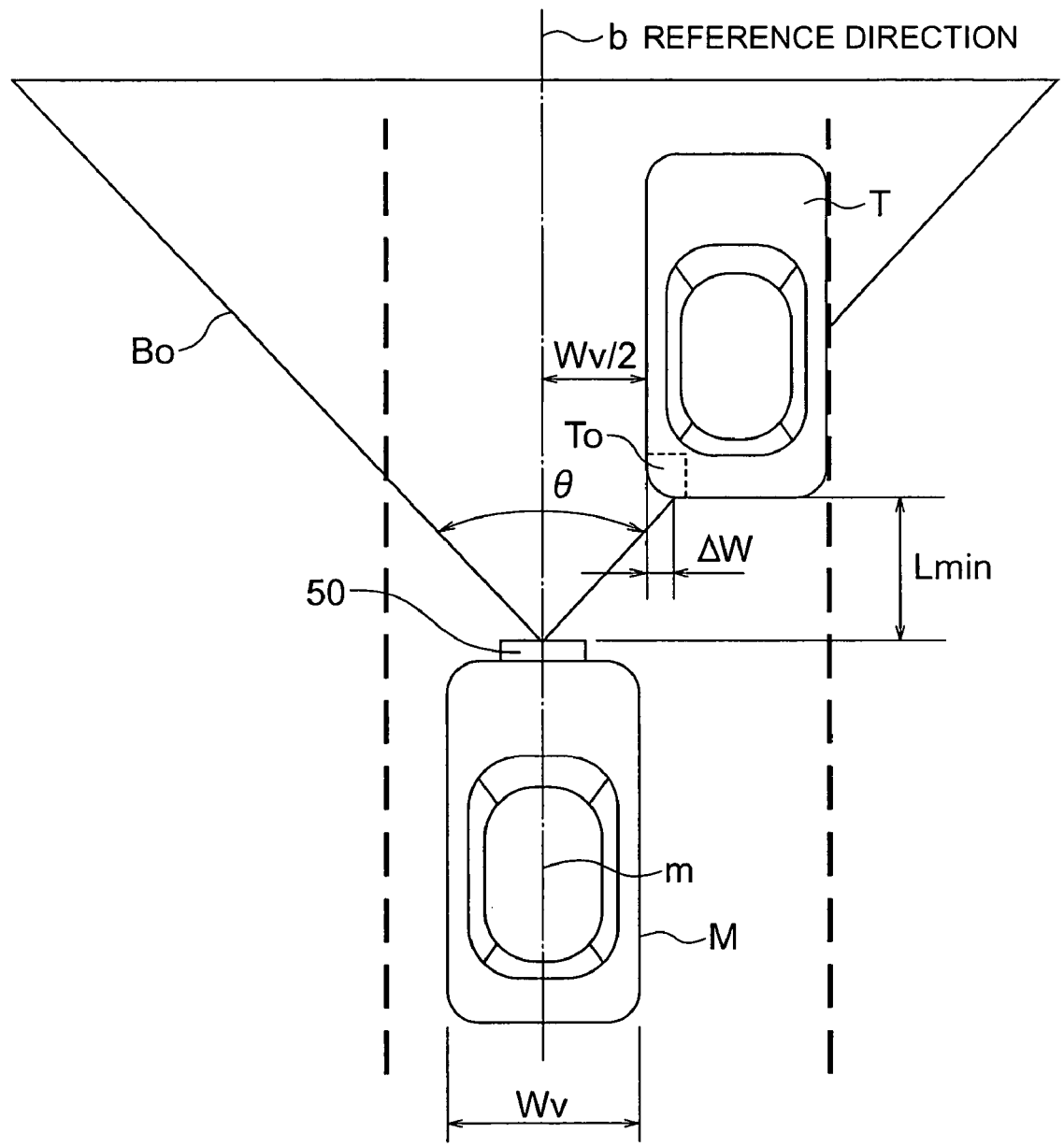
FIG. 9 is a diagram for explaining a positional relationship between a preceding vehicle and an electric field emitted from the transmitting antenna of the radar device according to the embodiment of the invention.
Figure 10:
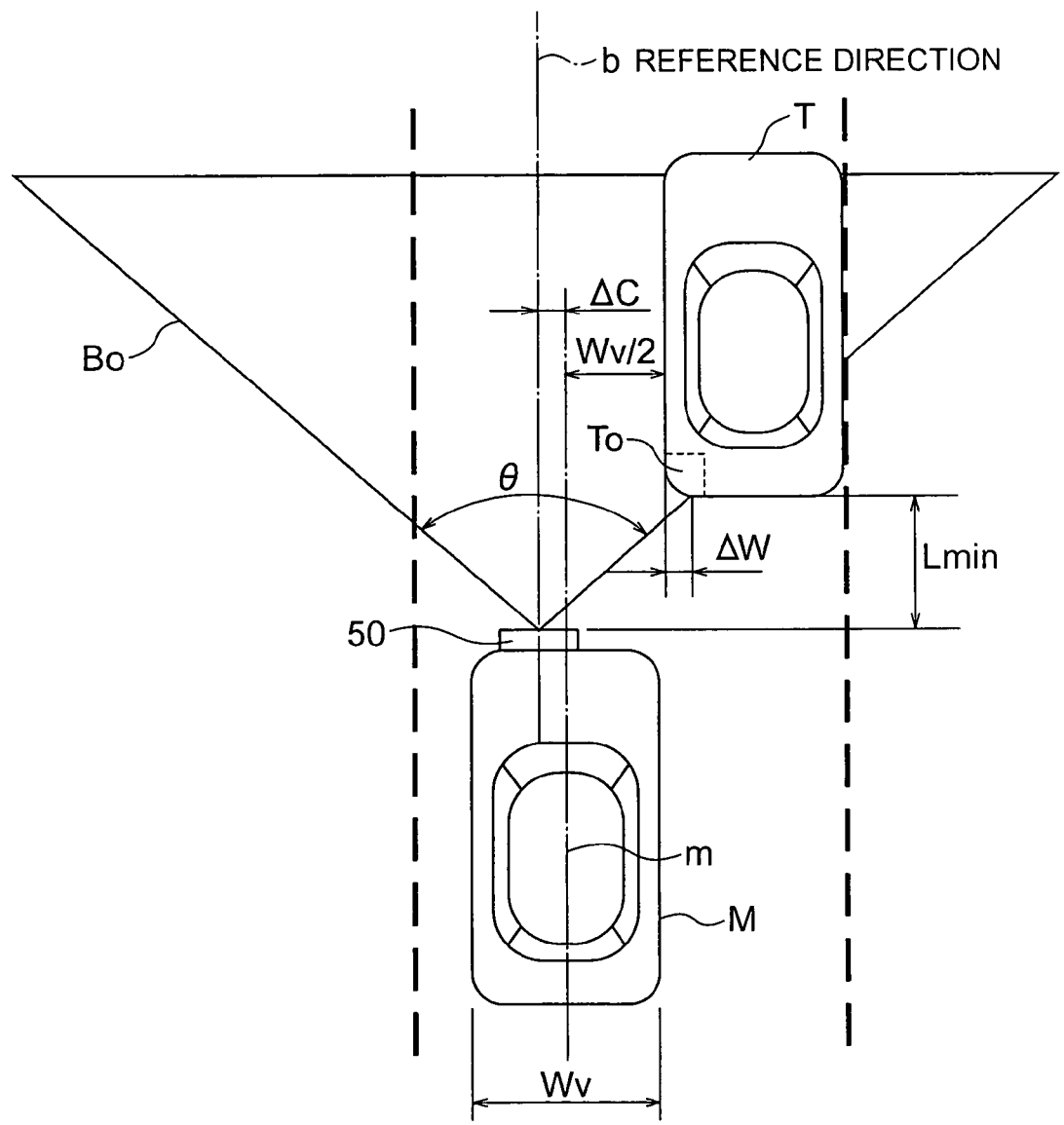
FIG. 10 is a diagram for explaining a positional relationship between a preceding vehicle and an electric field emitted from the transmitting antenna of the radar device according to the embodiment of the invention.

By configuring as described above, it is possible to detect not only an obstacle present in the driver's watching area when traveling at a high speed but also an obstacle present in the driver's watching area when traveling at a low speed, so that a single radar device can be used in either traveling condition of smooth traveling on a road without a traffic jam or low-speed running on a congested road or the like. Here, the reason of determining the field-of-view θ so to include at least a certain portion present in the closest distance from the own vehicle M in the emitted electric field is that an error ΔL is caused between a vehicle-to-vehicle distance $L_2$ detected by the radar 50 and a real vehicle-to-vehicle distance $L_1$ if the tail end of the preceding vehicle T which is present in the same traveling lane as the own vehicle M and close to a line, namely a portion in the closest distance from the own vehicle M, is not included in the emitted electric field as shown in FIG. 8. Therefore, for example, when the radar 50 is mounted in the vicinity of the front bumper of the own vehicle M so that a central axis m of the own vehicle M agrees substantially with a central axis (reference direction) b of the mm-Wave $B_0$ from the transmitting antenna 513 as shown in FIG. 9, the field-of-view θ of the mm-Wave $B_0$ from the transmitting antenna 513 is determined so that the emitted electric field includes an area $T_0$ including a position which is ahead by a distance Lmin corresponding to the minimum vehicle-to-vehicle distance when the own vehicle M becomes closest to the immediately preceding vehicle T while keeping safety and displaced by a distance corresponding to a half Wv/2 of a vehicle width Wv from the central axis m of the own vehicle M is included in the emitted electric field. In this case, a horizontal width ΔW of the area $T_0$ may be determined according to a horizontal resolution. As shown in FIG. 10, when the radar 50 is mounted near the front bumper of the own vehicle M so that the central axis (reference direction) b of the mm-Wave $B_0$ from the transmitting antenna 513 is offset from the central axis m of the own vehicle M, the field-of-view θ of the mm-Wave $B_0$ from the transmitting antenna 513 is determined so that the emitted electric field includes the area $T_0$ including a position which is ahead by a distance Lmin corresponding to the vehicle-to-vehicle distance when the own vehicle becomes closest to the immediately preceding vehicle T while keeping safety and displaced by a distance corresponding to the sum (Wv/2+ΔC) of a half Wv/2 of the vehicle width Wv and an offset amount ΔC of the central axis b of the mm-Wave $B_0$. In this case, the horizontal width ΔW of the area $T_0$ may be determined according to the horizontal resolution.

The receiving section 520 has a hybrid circuit 522 which generates a sum signal of output signals from two receiving antennas 521$a_1$, 521$a_2$ located at different positions and directed in the same direction as the central axis of the mm-Wave $B_0$ for the individual transmission frequencies $f_1$, $f_2$ and also generates a difference signal of the output signals from the two receiving antennas 521$a_1$, 521$a_2$ for one (e.g., $f_1$) of the transmission frequencies, two mixers 523$a_1$, 523$a_2$ which generate a beat signal by mixing each of output signals from the hybrid circuit 522 and a signal from the directional coupler 514, an analog circuit 525 which demodulates and amplifies a beat signal from each of the mixers 523$a_1$, 523$a_2$ for each of the transmission frequencies $f_1$, $f_2$, an A/D converter 524 which samples an analog signal output for each of the transmission frequencies $f_1$, $f_2$ from the analog circuit 525 at appropriate sampling intervals, and the like. By configuring as described above, the receiving section 520 receives echoes $B_1$, $B_2$ from the target at different positions and detects a difference signal and a sum signal of the echoes $B_1$, $B_2$ for each transmission frequency.

Figure 11:
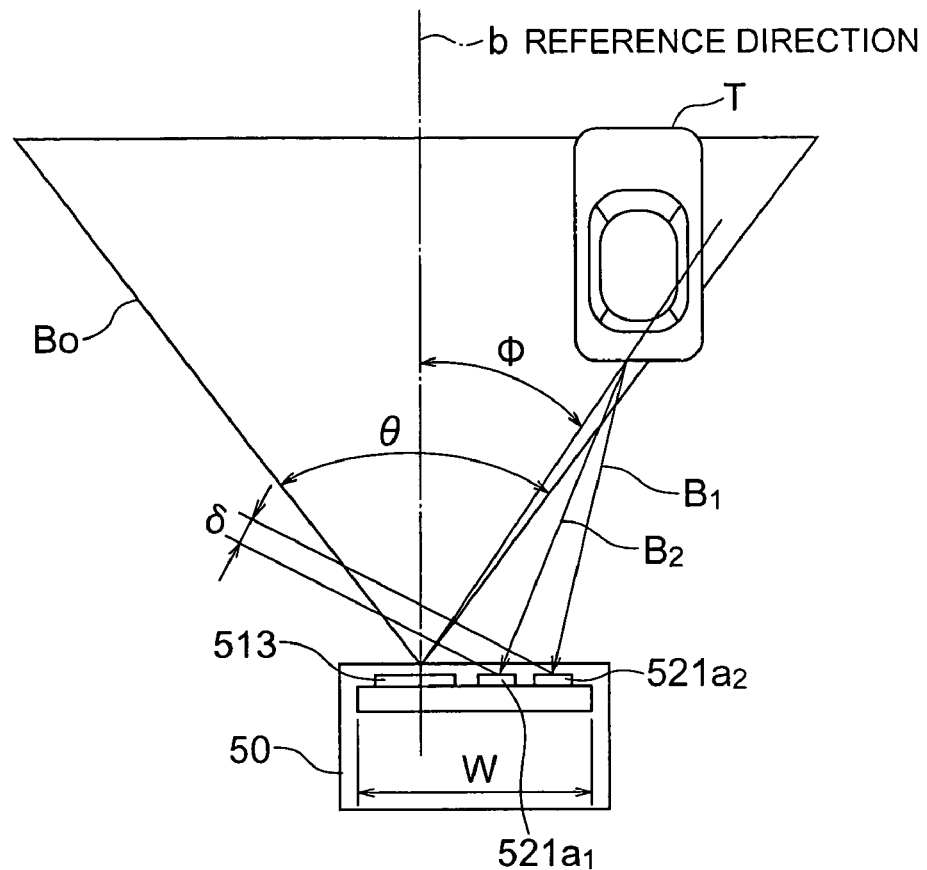
FIG. 11 is a diagram showing an arrangement of the transmitting antenna and the receiving antenna in the radar device according to the embodiment of the invention.
Figure 12:
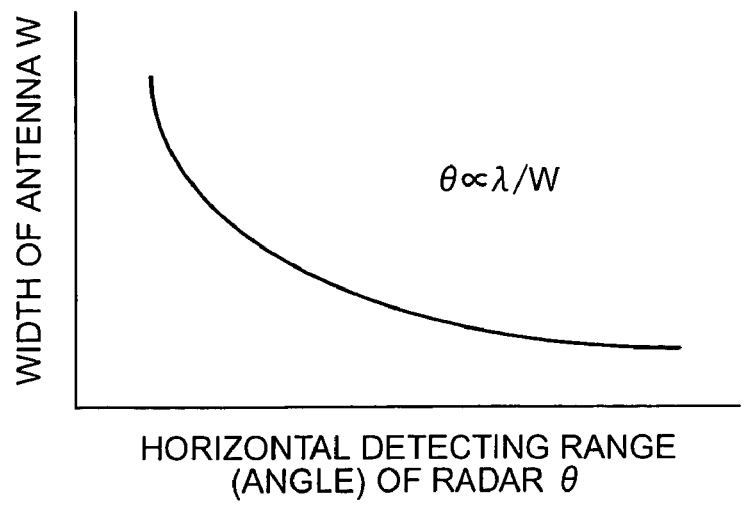
FIG. 12 is a diagram showing a relationship between an antenna width and a field-of-view of the radar device according to the embodiment of the invention.

Here, the two receiving antennas 521$a_1$, 521$a_2$ of the receiving section 520 are disposed to form a line in a horizontal direction together with the transmitting antenna 513 of the transmitting section 510 as shown in FIG. 11. Total length W of the arrangement of these three antennas 513, 521$a_1$, 521$a_2$ has a relationship indicated by the expression below between a wavelength λ and the field-of-view θ of the mm-Wave $B_0$ from the transmitting antenna 513 as shown in FIG. 12.

$$\theta \propto \lambda/W$$

Thus, the total length W of the arrangement of the three antennas 513, 521$a_1$, 521$a_2$ is inversely proportional to the field-of-view θ of the mm-Wave $B_0$ from the transmitting antenna 513. Therefore, when the field-of-view θ of the mm-Wave $B_0$ from the transmitting antenna 513 is expanded, the total length W of the arrangement of the three antennas 513, 521$a_1$, 521$a_2$ becomes short, and the overall size of the radar device can be made compact. As described above, the field-of-view θ of the mm-Wave $B_0$ from the transmitting antenna 513 is expanded to a level capable of detecting the vehicle which is in the shortest vehicle-to-vehicle distance when traveling at a low speed and close to a line in this embodiment, so that a compact radar device can be realized. In other words, the radar device, which can be used in either traveling condition of high-speed running or low-speed running, can be realized as compact one suitable for accommodation according to this embodiment.

The control section 530 has a digital signal processor which is connected to equipment (such as an output device to be described later) which uses the calculated result. This digital signal processor realizes a functional configuration section such as an FFT (FFT: Fast Fourier Transform) section 531, a signal processing section 532, and the like. As to two sum signals and a difference signal, the FFT section 531 decomposes the sampled signal from the A/D converter 524 into frequency components to output an amplitude, a frequency and a phase of the peak of the obtained frequency spectrum. The signal processing section 532 instructs timing of switching two transmission frequencies $f_1$, $f_2$ to the modulator 511, calculates based on the output from the FFT section 531 as shown below and outputs the calculated result as target information. First, in the output from the FFT section 531, the signal processing section 532 calculates a relative speed of the target and a distance to the target based on the frequency and phase of the peak of the frequency spectrum obtained from the sum signal of the respective transmission frequencies $f_1$, $f_2$ and outputs the calculated results as target information indicating the relative speed of the target and the distance to the target. And, the signal processing section 532 calculates an amplitude ratio (difference signal/sum signal) of the peak of the frequency spectra obtained from one sum signal and a difference signal of the same transmission frequency $f_1$ as that in the output from the FFT section 531. As shown in FIG. 11, when an azimuth angle of the target to the central axis (reference direction) b of the mm-Wave $B_0$ is not zero, a phase difference due to a difference δ in propagation distance is produced in echoes $B_1$, $B_2$ received by the two receiving antennas 521$a_1$, 521$a_2$, and the amplitude ratio calculated here becomes a value indicating the absolute value of the azimuth angle (φ in FIG. 11) of the target with respect to the reference direction. Then, the signal processing section 532 outputs the calculated amplitude ratio as target information indicating the azimuth angle φ of the target with respect to the reference direction. The signal processing section 532 also outputs the peak amplitude which is output from the FFT section 531 as target information indicating the presence or not of the target.

Then, a vehicle running support system having this radar device will be described.

Figure 13:
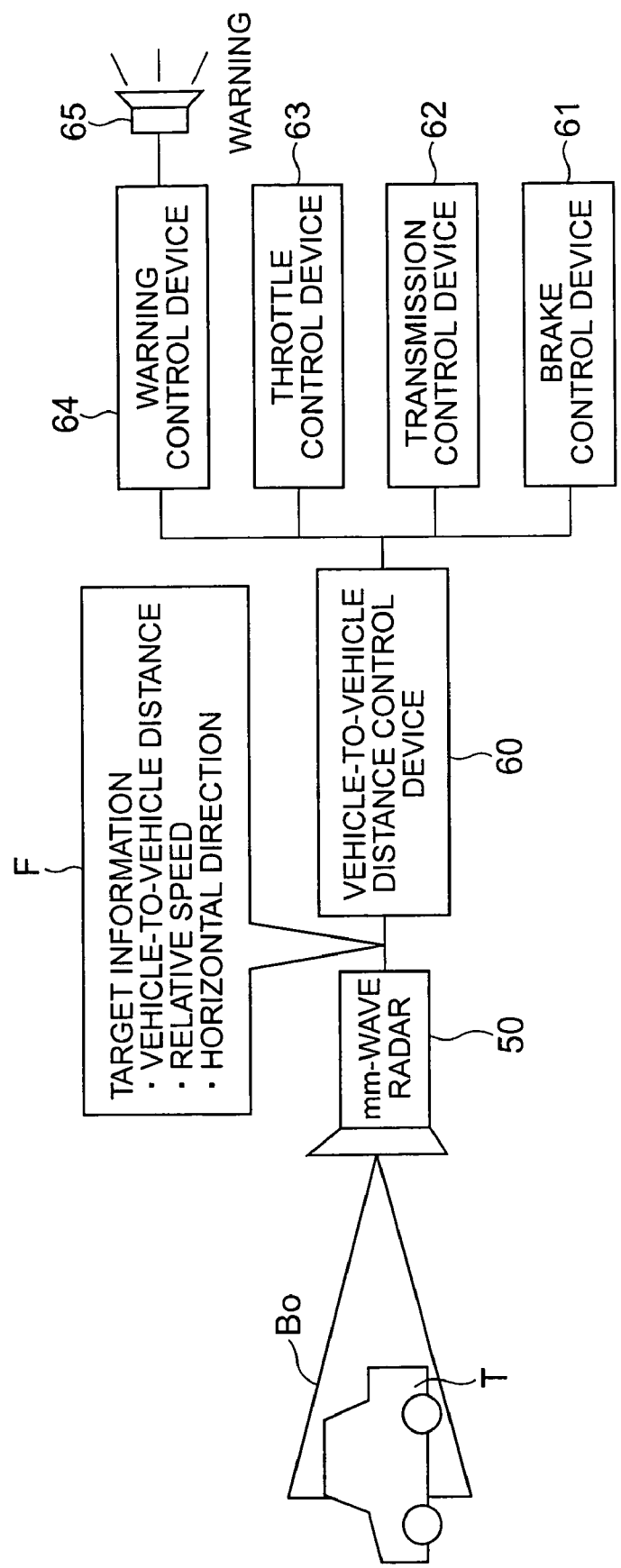
FIG. 13 is a block diagram of a running support system including the dual-frequency CW radar device according to one embodiment of the invention.

As shown in FIG. 13, this vehicle running support system includes the above-described radar device 50 for detecting target information F, a vehicle speed sensor (not shown) for detecting a running speed $V_M$ of the own vehicle M, a vehicle-to-vehicle distance control device 60 for outputting a control command based on the output F of the radar device 50 and the output $V_M$ of the vehicle speed sensor, a throttle control device 63 for controlling a throttle opening of the own vehicle M according to the control command from the vehicle-to-vehicle distance control device 60, a transmission control device 62 for controlling the transmission of the own vehicle M according to the control command from the vehicle-to-vehicle distance control device 60, a brake control device 61 for controlling the brakes of the own vehicle M according to the control command from the vehicle-to-vehicle distance control device 60, a warning device 65 for outputting a warning by voice or the like, a warning control device 64 for controlling the warning device 65 according to the control command from the vehicle-to-vehicle distance control device 60, and the like.

Figure 14:
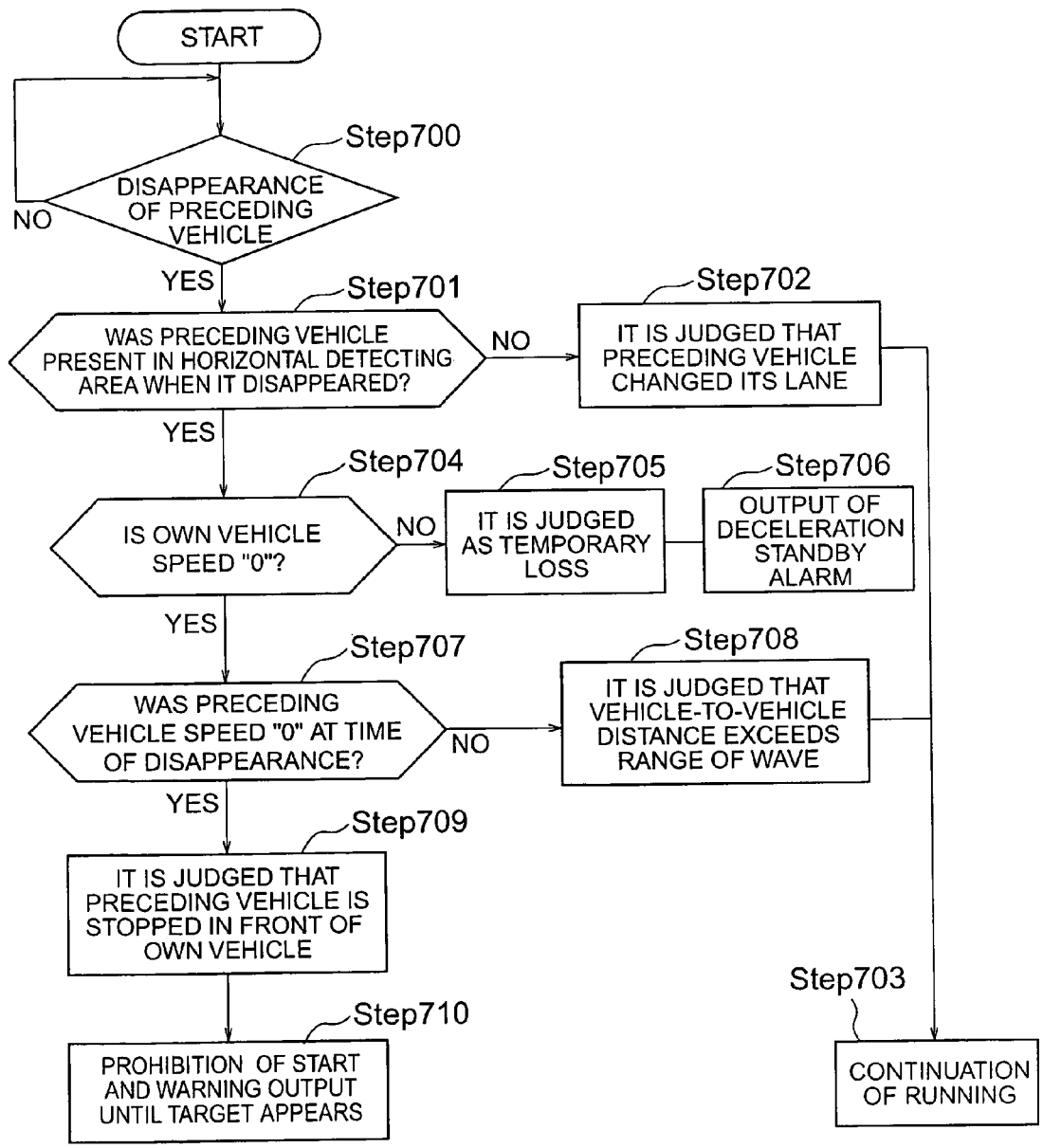
FIG. 14 is a flowchart of control processing performed by the running support system including the dual-frequency CW radar device according to one embodiment of the invention.

According to the above-described system, when the own vehicle M is running at a low speed, the vehicle-to-vehicle distance control device 60 repeatedly performs the control processing shown in FIG. 14 based on the output F of the radar device 50 and output V of the vehicle speed sensor. Specifically, it is performed as follows.

When the own vehicle M starts to run at a low speed, the vehicle-to-vehicle distance control device 60 monitors a distance to the preceding vehicle T in the target information F sequentially output by the radar device 50 to sequentially judge whether or not the preceding vehicle T is present within a prescribed distance from the own vehicle M. If the preceding vehicle T is found within a prescribed distance from the own vehicle M, the vehicle-to-vehicle distance control device 60 monitors a level of the signal indicating the presence or not of the preceding vehicle T in the target information F (Step 700).

Figure 15:
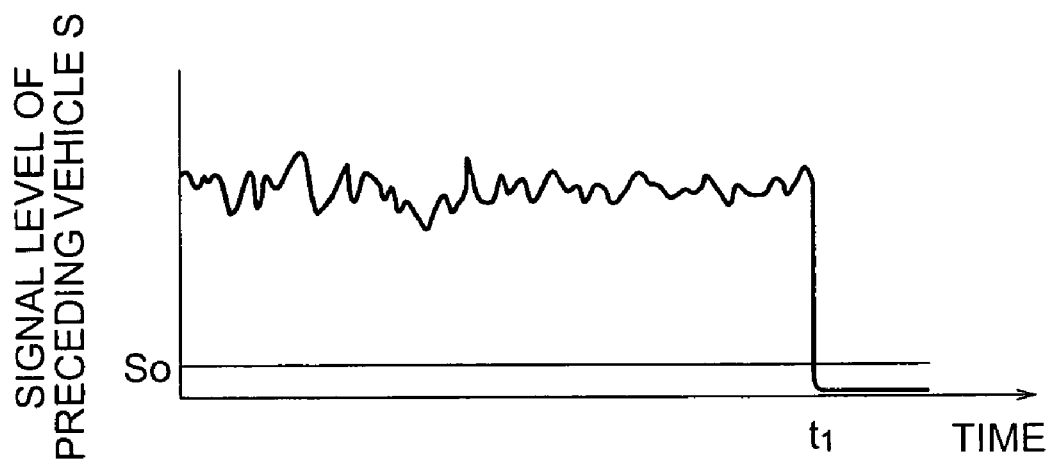
FIG. 15 is a diagram showing a modified example of the output signal level showing the presence or not of a preceding vehicle of the dual-frequency CW radar device according to one embodiment of the invention.

At this time, when a signal level S of the radar output indicating the presence or not of the preceding vehicle T drops sharply to a threshold value $S_0$ or below as shown in FIG. 15, the vehicle-to-vehicle distance control device 60 judges that the echo from the preceding vehicle T has disappeared and also judges whether or not the preceding vehicle T is present within an electric field emitted from the transmitting antenna 513 at the time of disappearance $t_1$ of the echo. Specifically, when a horizontal azimuth angle $\phi$ of the preceding vehicle T, which has moved out of the electric field emitted from the transmitting antenna 513, is outside of the field-of-view $\theta$ of the mm-Wave $B_0$ from the transmitting antenna 513 at the time of echo disappearance $t_1$ as shown at the middle and bottom of FIG. 16, it is judged that the preceding vehicle T has moved out of the electric field emitted from the transmitting antenna 513. And, when the horizontal azimuth angle $\phi$ of the preceding vehicle T, which has moved out of the electric field emitted from the transmitting antenna 513, is within the field-of-view $\theta$ of the mm-Wave $B_0$ from the transmitting antenna 513 at the time of echo disappearance $t_1$ as shown at the middle and bottom in FIG. 17, it is judged that the preceding vehicle T is within the electric field emitted from the transmitting antenna 513 (Step 701).

Figure 16:
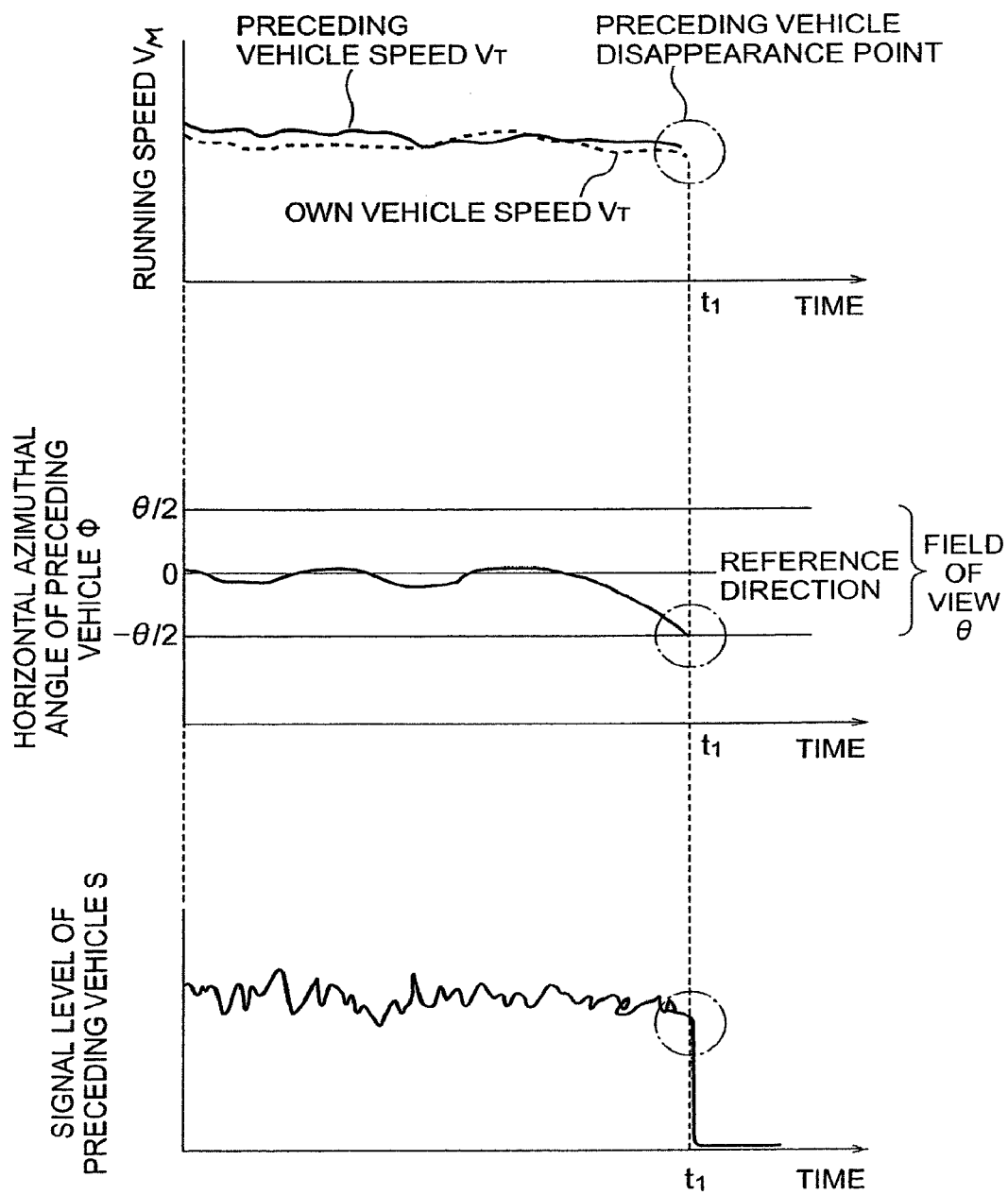
FIG. 16 is a diagram for explaining a method of judging a positional relationship between the preceding vehicle and the own vehicle based on output from the dual-frequency CW radar according to one embodiment of the invention.

When it is judged that the preceding vehicle T has moved out of the electric field emitted from the transmitting antenna 513, the vehicle-to-vehicle distance control device 60 judges that the preceding vehicle T has moved out of the running lane of the own vehicle M because the preceding vehicle T or the own vehicle M has changed its lane (Step 702) and gives a control command for making to keep the running speed $V_M$ of the own vehicle M to the throttle control device 63 at the time of echo disappearance $t_1$ shown in FIG. 16 (Step 703).

Meanwhile, when it is judged that the preceding vehicle T is present within the electric field emitted from the transmitting antenna 513, the vehicle-to-vehicle control device 60 judges whether or not the own vehicle M is running or not at the time of echo disappearance $t_1$. Specifically, when the output $V_M$ of the vehicle speed sensor has the threshold value $V_0$ or more at the time of echo disappearance $t_1$, it is judged that the own vehicle M was running at the time of echo disappearance $t_1$, and when the output is other than what was described above, it is judged that the own vehicle M was stopped at the time of echo disappearance $t_1$ (Step 704).

At this time, when it is judged that the own vehicle M was running at the time of echo disappearance $t_1$, the vehicle-to-vehicle distance control device 60 judges that the target present in the electric field emitted from the transmitting antenna 513 is temporarily lost (Step 705) and gives a deceleration command to the throttle control device 63 and the transmission control device 62 and also a warning output command to the warning control device 64 (Step 706). Thus, the own vehicle M decelerates when issuing a warning from the warning device 65.

Figure 17:
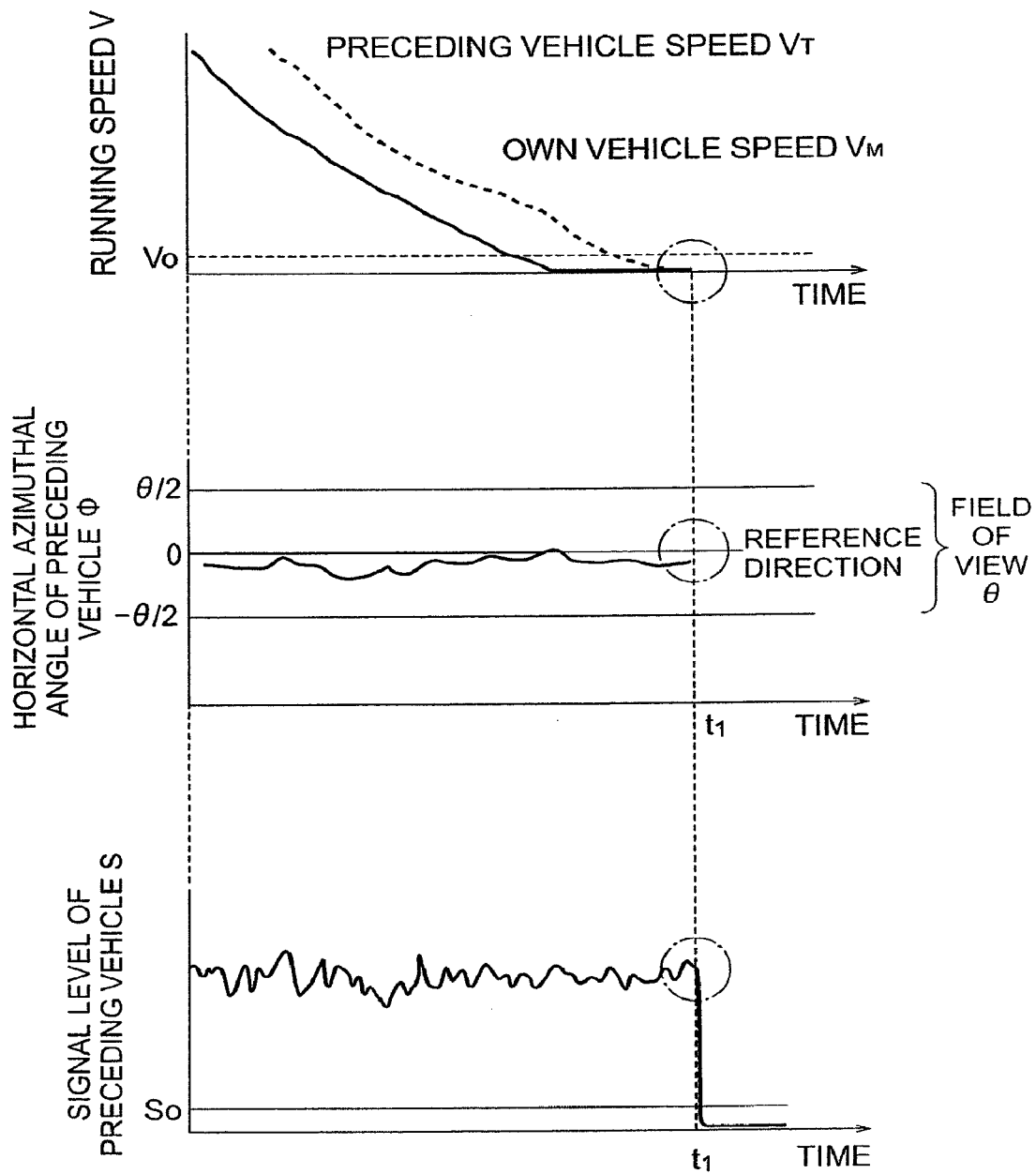
FIG. 17 is a diagram for explaining a method of judging a positional relationship between the preceding vehicle and the own vehicle based on output from the dual-frequency CW radar according to one embodiment of the invention.

Meanwhile, when it is judged that the own vehicle M was stopped at the time of echo disappearance $t_1$, the vehicle-to-vehicle distance control device 60 judges whether or not the preceding vehicle T was running at the time of echo disappearance $t_1$. Specifically, a running speed $V_T$ of the preceding vehicle T at the time of echo disappearance $t_1$ is calculated by subtracting the output $V_M$ of the vehicle speed sensor at the time of echo disappearance $t_1$ from a relative speed of the preceding vehicle T at the time of echo disappearance $t_1$. When the calculated value is a threshold value $V_0$ or more, it is judged that the preceding vehicle T was running at the time of echo disappearance $t_1$, and when it is other than what was described above, it is judged that the preceding vehicle T was stopped at the time of echo disappearance $t_1$ (Step 707). When it is judged that the preceding vehicle T was running at the time of echo disappearance $t_1$, the vehicle-to-vehicle distance control device 60 judges that the distance between the own vehicle M and the preceding vehicle T has increased to a reached distance or more of the mm-Waves $B_0$ and gives a control command for making to keep the running speed $V_M$ of the own vehicle M at the time of echo disappearance $t_1$ to the throttle control device 63 (Step 703). And, when it is judged that the preceding vehicle T was stopped at the time of echo disappearance $t_1$, both the preceding vehicle T and the own vehicle M were stopped at the time of echo disappearance $t_1$ as shown in FIG. 17, so that the vehicle-to-vehicle distance control device 60 judges that the preceding vehicle T is stopped in front of the stopped own vehicle M (Step 709), gives a warning output command to the warning control device 64 and prohibits the own vehicle M from starting to move until a signal level S of the radar output indicating the presence or not of the preceding vehicle T exceeds the threshold value $S_0$ again (Step 710). Thus, the own vehicle M keeps the stopped state until the preceding vehicle T starts to move again after the warning device 65 issues a warning.

The radar device 50 according to this embodiment can detect even a preceding vehicle, which is most approached and close to a line when traveling at a low speed, without fail as described above. Therefore, the above-described control processing can be performed based on the output of the radar device 50 to enhance traveling safety when the own vehicle has become closer to the preceding vehicle when traveling at a low speed.

Incidentally, preceding vehicles T which come closer to the own vehicle M when running at a low speed include big trucks having a large height. When the own vehicle M approaches such a preceding vehicle T with a large height, there is a possibility that the mm-Wave $B_0$ from the radar device 50 mounted in the vicinity of the front bumper of the own vehicle M passes through below the body of the preceding vehicle T. Therefore, a rotating shaft for holding the radar device 50 to be vertically rotatable and a servomotor for rotating the radar device 50 about the rotating shaft are additionally disposed to prevent the mm-Wave $B_0$ from the radar device 50 from passing through when the own vehicle comes closer to a preceding vehicle having a large height. Specific description will be made below.

Figure 18:
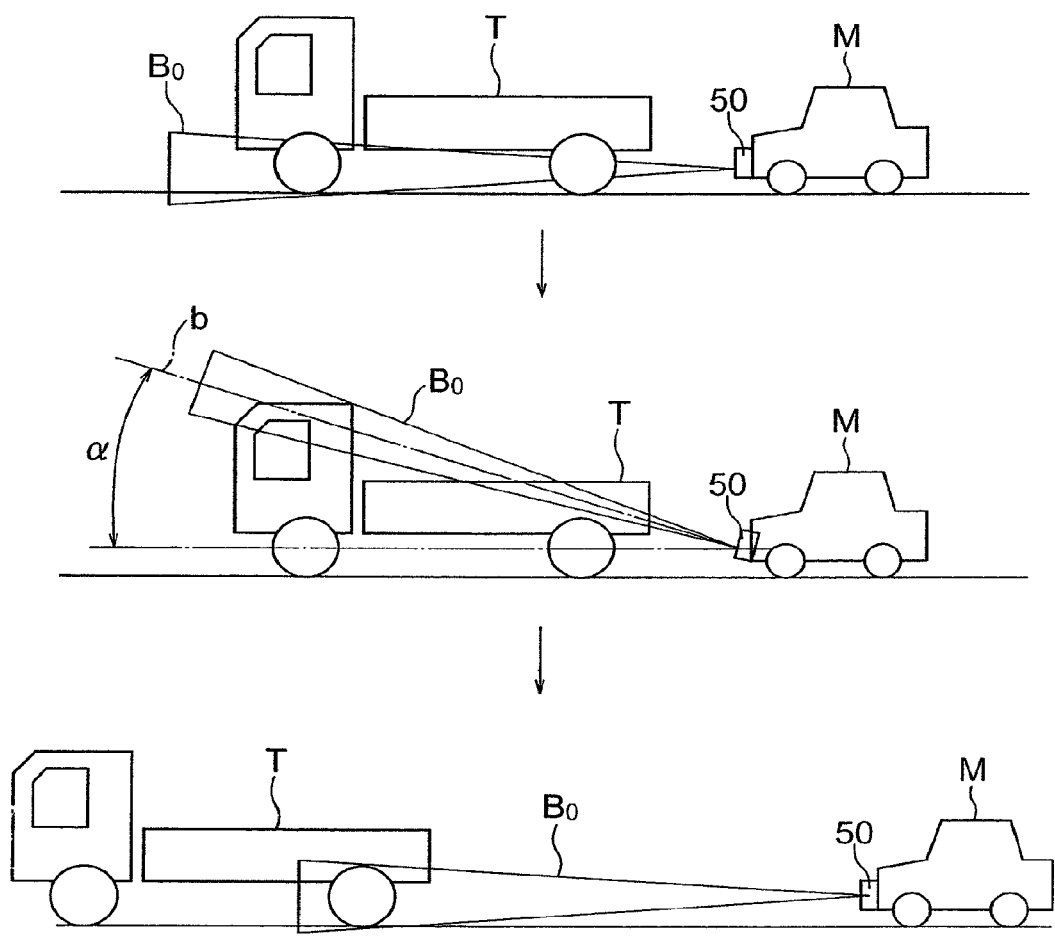
FIG. 18 is a diagram for explaining a method of controlling a propagation direction of a mm-Wave from the radar device according to one embodiment of the invention.
Figure 19:
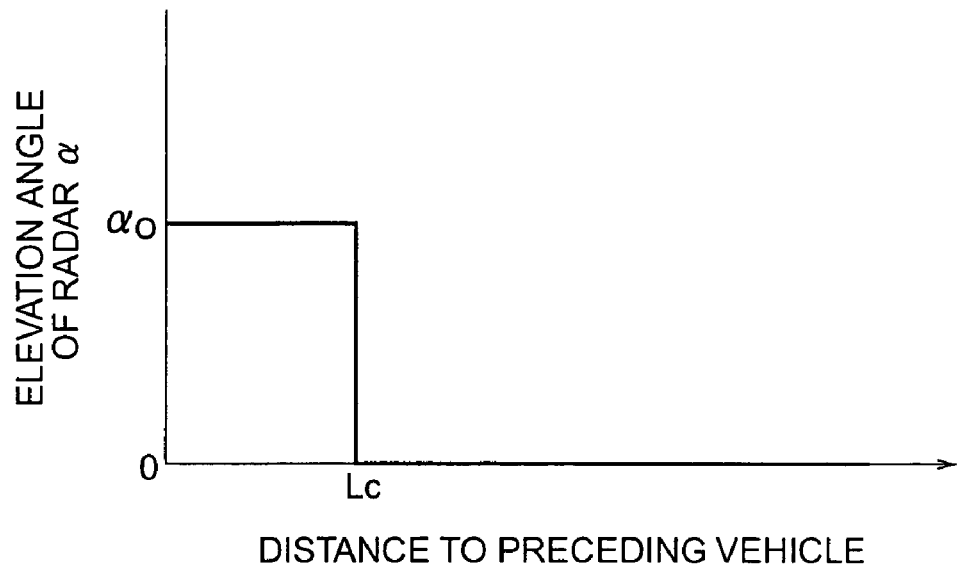
FIG. 19 is a diagram showing a correspondence relationship between the elevation angle of the radar device and the distance to the preceding vehicle of FIG. 18.
Figure 20:
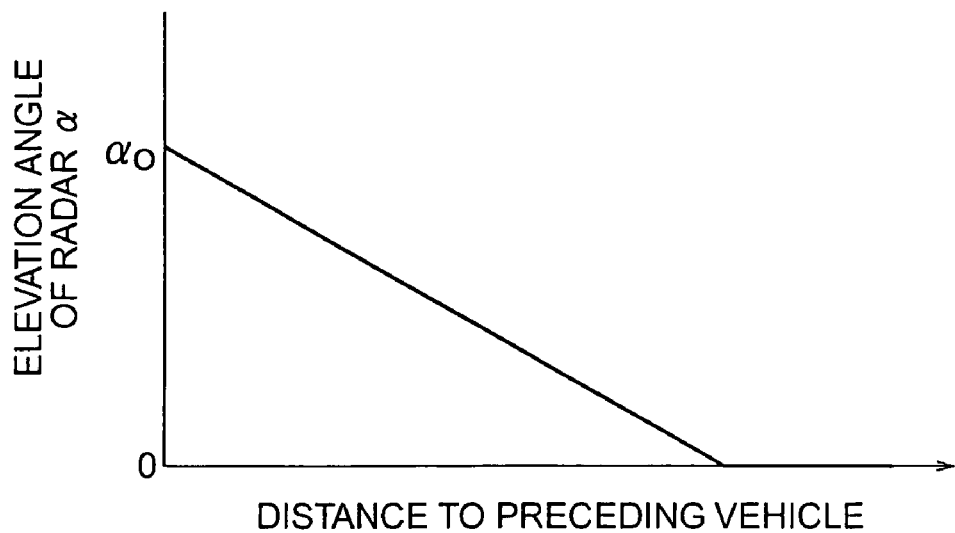
FIG. 20 is a diagram showing a correspondence relationship between the elevation angle of the radar device and the distance to the preceding vehicle of FIG. 18.

As shown at the top of FIG. 18, when the own vehicle 50 approaches a prescribed distance from a preceding vehicle T having a large height, the mm-Wave $B_0$ from the radar device 50 mounted in the vicinity of the front bumper of the own vehicle M starts to pass through below the body of the preceding vehicle T. Therefore, the target is temporarily lost. Then, when the temporary target lost state occurs, the vehicle-to-vehicle distance control device 60 controls the servomotor to turn upward the radar device 50 as shown at the middle of FIG. 18. Thus, the mm-Wave $B_0$ from the radar device 50 is directed upward, so that the tail end of the preceding vehicle T having a large height which is close to the own vehicle M can be detected. Here, the radar device 50 may be turned so that an elevation angle $\alpha$ of the radar device 50 is changed from zero degree to a prescribed angle $\alpha_0$ as shown in FIG. 19, or the elevation angle $\alpha$ of the radar device 50 may be increased gradually from zero degree to the prescribed angle $\alpha_0$ as the distance to the preceding vehicle T decreases as shown in FIG. 20.

Then, when the distance from the preceding vehicle T begins to increase and the mm-Wave $B_0$ from the radar device 50 passes over the body of the preceding vehicle T, there occurs a temporary target lost state again. Under such a condition, the vehicle-to-vehicle distance control device 60 controls the servomotor to turn the radar device 50 downward as shown in at the bottom of FIG. 18. Thus, the mm-Wave $B_0$ from the radar device 50 returns to the horizontal state, so that it becomes possible to detect the tail end of the preceding vehicle T having a large height that is getting away from the own vehicle. At this time, the radar device 50 may be turned to change the elevation angle $\alpha$ of the radar device 50 from the prescribed angle $\alpha_0$ to zero degree or the elevation angle $\alpha$ of the radar device 50 may be increased gradually from the prescribed angle $\alpha_0$ to zero degree as the distance from the preceding vehicle T increases.

Thus, the preceding vehicle having a large height can also be detected by controlling the elevation angle α of the radar device 50.

Figure 21:
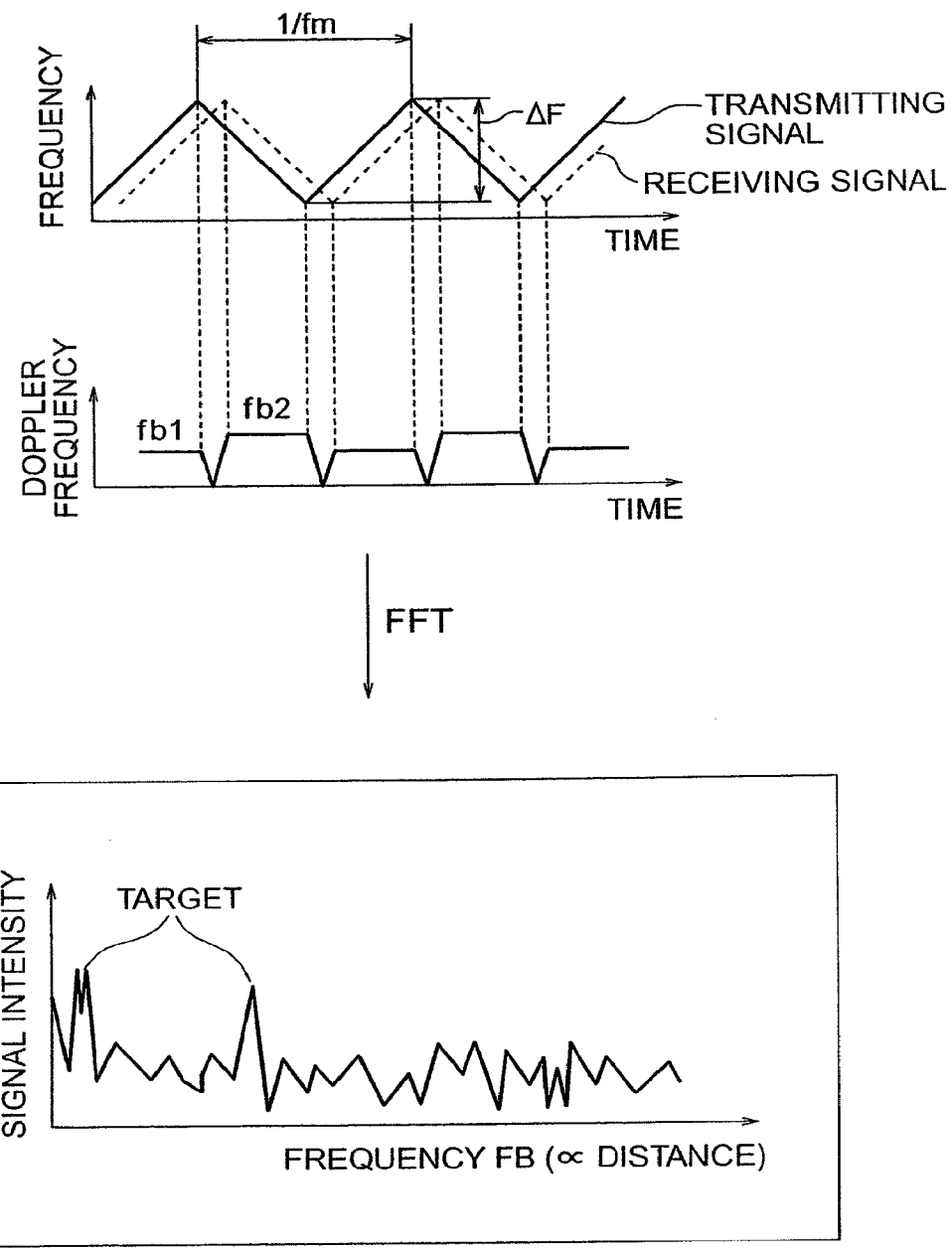
FIG. 21 is a diagram for explaining a vehicle-to-vehicle distance calculation method by an FMCW system radar.

As described above, one embodiment of the invention was described with reference to the dual-frequency CW radar as an example, but it is to be understood that the application of the invention is not prohibited by a difference in mm-Waves used by the radar device. For example, the same effects as those of the above-described dual-frequency CW radar can be obtained even when the invention is applied to the FMCW radar which sends a continuous wave undergone the frequency modulation by a triangular wave as shown in FIG. 21. To apply the present invention to a radar of a type other than the dual-frequency CW system, it is necessary to calculate a relative speed of the target and a distance from the target by a calculation method appropriate to that type of radar. For example, when the present invention is applied to the FMCW radar, a beat signal obtained by mixing the transmitted mm-Wave and the echo from the target is subjected to the FFT processing, and a distance to the target and a relative speed of the target are obtained from the peaks of the frequency spectrum obtained as a result as shown in FIG. 21.

When a radar of a type other than the dual-frequency CW system to which the present invention is applied is adopted as a radar device of the running support system shown in FIG. 13, it is necessary to appropriately change the control processing to be performed by the vehicle-to-vehicle distance control device depending on the output of the radar. For example, when the FMCW radar to which the present invention is applied is adopted, a signal indicating the presence of the preceding vehicle is lost if both the own vehicle and the preceding vehicle stop. Therefore, a control processing different from the above-described control processing of the running support system adopting the dual-frequency CW radar is carried out. For example, when the vehicle-to-vehicle distance control device monitors a relative speed of the preceding vehicle which is present at a prescribed distance from the own vehicle and a running speed of the own vehicle and both of them have a threshold value $V_0$ or below, it is judged that the preceding vehicle is stopped in front of the stopped own vehicle. Then, a warning output command is given to the warning control device 64, and it may be configured to prohibit the own vehicle from starting to move until the relative speed of the preceding vehicle present at a prescribed distance from the own vehicle exceeds the threshold value $V_0$ again. Besides, in addition to the above control processing, it is desirable to perform the processing excluding Step 709 and Step 710 in the processing contained in Step 704 in the control processing shown in FIG. 14 by the vehicle-to-vehicle distance control device. To do so, for example, it may be configured to judge in Step 704 that a relative speed of the preceding vehicle is not higher than the threshold value $V_0$, to perform Step 705 and Step 706 when the relative speed of the preceding vehicle is not higher than the threshold value $V_0$, and to perform Step 708 and Step 703 when the relative speed of the preceding vehicle exceeds the threshold value $V_0$.

According to the present invention, traveling safety of a vehicle running at a low speed, which has come closer to a preceding vehicle, can be enhanced furthermore.

The invention claimed is:

1. A radar device mounted on a vehicle, for detecting a target situated in a running direction of the vehicle, said radar device comprising:

a transmitting section for outputting a radio wave;

a transmitting antenna for transmitting the radio wave from the transmitting section, said transmitting antenna being configured such that an electric field is formed in an area located in the running direction of the vehicle, which area has a predetermined width and includes a point that is located at a predetermined distance from the vehicle, said predetermined width being a function of width of the vehicle, and said predetermined distance being a function of a minimum distance between the vehicle and the target;

first and second receiving antennas disposed at mutually different positions, for receiving the transmitted radio waves after they have been reflected from the target;

a receiving section for receiving the reflected radio waves from the target, via the receiving antennas; and a signal processing section for performing signal processing, based on signals from the receiving section; wherein, the radar device outputs a processed signal for controlling running of the vehicle based thereon; and the radar device is connected to a control device so that, if the radar device interrupts outputting of the processed signal, the control device does not output a command to start the vehicle in motion until receiving a processed signal after the radar device resumes outputting of the processed signal.

2. A radar system for a vehicle, comprising:

a radar device including a transmitting section for outputting radio waves to detect a target situated in a running direction of the vehicle;

a transmitting antenna for transmitting the radio waves from the transmitting section, said transmitting antenna being configured such that an electric field is formed in an area located in the running direction of the vehicle, which area has a predetermined width and includes a point that is located at a predetermined distance from the vehicle, said predetermined width being a function of the width of the vehicle, and said predetermined distance being a function of a minimum distance between the vehicle and the target;

first and second receiving antennas disposed at mutually different positions, for receiving the transmitted radio waves after they have been reflected from the target;

a receiving section for receiving radio waves reflected from the target, via the receiving antennas;

a signal processing section for performing signal processing based on signals from the receiving section;

a rotatable shaft for swinging a surface of the transmitting antenna about a vertical axis of the vehicle;

an electric motor for applying driving power to the rotatable shaft; and a control device for controlling a rotational angle of the motor according to a distance of the target detected by the radar device, to rotate a direction of the radar device.

3. A radar system for a vehicle, comprising:

a radar device including a transmitting section for outputting radio waves to detect a target situated in a running direction of the vehicle;

a transmitting antenna for transmitting the radio waves from the transmitting section, said transmitting antenna being configured such that an electric field is formed in an area located in the running direction of the vehicle, which area has a predetermined width and includes a point that is located at a predetermined distance from the vehicle, said predetermined width being a function of the width of the vehicle, and said predetermined distance being a function of a minimum distance between the vehicle and the target;

first and second receiving antennas disposed at mutually different positions, for receiving the transmitted radio waves after they have been reflected from the target;

a receiving section for receiving radio waves reflected from the target, via the receiving antennas;

a signal processing section for performing signal processing based on signals from the receiving section; and a control device connected to the radar device, for outputting a command to start the vehicle;

wherein, the control device does not output a command to start the vehicle in motion if the radar device interrupts outputting of the processed signal, until the control device receives a processed signal after the radar device resumes outputting of the processed signal.

4. The radar system according to claim 3, further comprising a warning device for outputting a warning when, after detecting the target, the radar device becomes unable to detect the target.

5. A radar device mounted on a vehicle, for detecting a target situated in a running direction of the vehicle, said radar device comprising:

a transmitting section for outputting radio waves; and a transmitting antenna for transmitting said radio waves; wherein, said antenna has a configuration such that an electric field is formed in an area located in the running direction of the vehicle, said area having a predetermined width at a predetermined distance from the vehicle, and said predetermined width being a function of width of the vehicle;

the radar device outputs a processed signal for controlling running of the vehicle based thereon; and the radar device is connected to a control device so that, if the radar device interrupts outputting of the processed signal, the control device does not output a command to start the vehicle in motion until receiving a processed signal after the radar device resumes outputting of the processed signal.

6. The radar device according to claim 5, wherein:

said predetermined width is selected such that said area includes a point that is ahead of said vehicle by said predetermined distance and is laterally displaced from a central longitudinal axis of the vehicle by a distance corresponding to a half of a width of the vehicle.

7. The radar device according to claim 5, wherein:

said predetermined width selected such so that said area includes a point that is ahead of said vehicle by said predetermined distance and is laterally displaced from a central longitudinal axis of the vehicle by a distance that is equal to the sum of half the width of the own vehicle and an offset amount.

8. A radar device mounted on a vehicle, for detecting a target situated in a running direction of the vehicle, said radar device comprising:

a transmitting section for outputting radio waves; and a transmitting antenna for transmitting said radio waves; wherein, said antenna has a configuration such that an electric field is formed in an area located in the running direction of the vehicle, said area having a predetermined width at a predetermined distance from the vehicle, and said predetermined width being a function of width of the vehicle; and the radar device further comprises, first and second receiving antennas disposed at mutually different positions, for receiving transmitted radio waves after they have been reflected from the target;

a receiving section for receiving radio waves reflected from the target, via the receiving antennas;

a signal processing section for performing signal processing based on signals from the receiving section;

a rotatable shaft for swinging a surface of the transmitting antenna about a vertical axis of the vehicle;

an electric motor for applying driving power to the rotatable shaft; and a control device for controlling a rotational angle of the motor according to a distance of the target detected by the radar device, to rotate a direction of the radar device.

9. A radar device mounted on a vehicle, for detecting a target situated in a running direction of the vehicle, said radar device comprising:

a transmitting section for outputting radio waves; and a transmitting antenna for transmitting said radio waves; wherein, said antenna has a configuration such that an electric field is formed in an area located in the running direction of the vehicle, said area having a predetermined width at a predetermined distance from the vehicle, and said predetermined width being a function of width of the vehicle;

radar device further comprises, first and second receiving antennas disposed at mutually different positions, for receiving the transmitted radio waves after they have been reflected from the target;

a receiving section for receiving radio waves reflected from the target, via the receiving antennas;

a signal processing section for performing signal processing based on signals from the receiving section; and a control device connected to the radar device, for outputting a command to start the vehicle in motion; and the control device does not output a command to start the vehicle if the radar device interrupts outputting of the processed signal, until the control device receives a processed signal after the radar device resumes outputting of the processed signal.

10. The radar device according to claim 9, further comprising a warning device for outputting a warning when, after detecting the target, the radar device becomes unable to detect the target.

* * * * *